United States Patent
Rengaswamy et al.

(10) Patent No.: US 8,562,121 B2
(45) Date of Patent: *Oct. 22, 2013

(54) BLACK INK-JET INKS WITH REDUCED LIGHTNESS AND HAZE

(75) Inventors: Sukanya Rengaswamy, Corvallis, OR (US); Zia Ur Rehman, Corvallis, OR (US); Mary E. Austin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 493 days.

This patent is subject to a terminal disclaimer.

(21) Appl. No.: 12/744,923

(22) PCT Filed: Nov. 30, 2007

(86) PCT No.: PCT/US2007/086141
§ 371 (c)(1),
(2), (4) Date: May 26, 2010

(87) PCT Pub. No.: WO2009/070176
PCT Pub. Date: Jun. 4, 2009

(65) Prior Publication Data
US 2011/0043577 A1 Feb. 24, 2011

(51) Int. Cl.
*C09D 11/00* (2006.01)

(52) U.S. Cl.
USPC ........................... 347/100; 106/31.13

(58) Field of Classification Search
USPC ........................... 347/100; 106/31.13
See application file for complete search history.

(56) References Cited

U.S. PATENT DOCUMENTS

| | | | |
|---|---|---|---|
| 6,460,989 B1 | 10/2002 | Yano et al. | |
| 6,596,065 B2 | 7/2003 | Ito et al. | |
| 6,673,140 B2 | 1/2004 | Tyrell et al. | |
| 6,749,674 B2 | 6/2004 | Geisenberger et al. | |
| 7,025,813 B2 | 4/2006 | Vanmaele et al. | |
| 7,029,523 B2 | 4/2006 | Taguchi et al. | |
| 7,048,790 B2 | 5/2006 | Taguchi et al. | |
| 7,503,965 B2 | 3/2009 | Matsui et al. | |
| 7,637,992 B2 * | 12/2009 | Mistry | 106/31.5 |
| 7,828,887 B2 * | 11/2010 | Rengaswamy et al. | 106/31.58 |
| 7,887,627 B2 * | 2/2011 | Rengaswamy et al. | 106/31.5 |
| 2003/0019395 A1 | 1/2003 | Ma et al. | |
| 2004/0216638 A1 * | 11/2004 | Rolly | 106/31.13 |
| 2004/0246321 A1 | 12/2004 | Takashima et al. | |
| 2006/0054054 A1 | 3/2006 | Devonald | |
| 2007/0120920 A1 | 5/2007 | Taguchi et al. | |
| 2008/0266334 A1 * | 10/2008 | Rehman et al. | 347/1 |

FOREIGN PATENT DOCUMENTS

| | | |
|---|---|---|
| EP | 1099732 A1 | 5/2001 |
| EP | 1243628 A1 | 9/2002 |
| EP | 1266765 A1 | 12/2002 |
| JP | 1993-013997 B | 2/1993 |
| JP | 09286122 | 4/1997 |
| JP | 2002103801 | 3/2000 |
| JP | 2000318299 | 11/2000 |
| JP | 2001-106946 | 4/2001 |
| JP | 2002-003762 | 1/2002 |
| JP | 2002225422 | 8/2002 |
| JP | 2002370444 | 12/2002 |
| JP | 2004-075719 | 3/2004 |
| JP | 2007-217530 | 8/2007 |
| WO | WO 2005052065 A1 * | 6/2005 |
| WO | WO 2006/096840 | 9/2006 |
| WO | WO-2007/132151 A1 | 11/2007 |

OTHER PUBLICATIONS

Hewlett-Packard Development Company, L.P., Search Report dated Aug. 25, 2011, EP App. No. 07854878.1, 3 p.
WO ISR dated Aug. 25, 2008.

* cited by examiner

*Primary Examiner* — Laura Martin

(57) ABSTRACT

A method of decreasing L*min and reducing stacked haze in a black region of an ink-jet printed image is disclosed which includes providing an ink-jet ink receptive medium and ink-jetting at least one ink-jet ink onto the medium to form a printed medium including an image having at least one black region. At least one of the ink-jet inks includes a black ink-jet ink including a liquid vehicle and a certain black azo dye having the Formula 1. The method includes stacking the printed medium, to obtain a printed medium having decreased L*min and reduced stacked haze in the black region(s).

16 Claims, No Drawings

BLACK INK-JET INKS WITH REDUCED LIGHTNESS AND HAZE

BACKGROUND

In ink-jet technology, the quality of high-resolution images is a function of the ink-jet ink used to produce an image, the printer and the print medium upon which the image is printed. In ink-jet printing, droplets of ink are ejected from a printhead in response to electrical signals generated by a microprocessor and are deposited on a print medium, such as paper or polymeric substrates, to form the desired image.

Colorant and inks for use in ink-jet printing should provide good print quality, reliability performance, and environmental robustness, when used individually as well as in combination with other dyes and inks. A single ink-jet colorant and/or ink that has good chroma, gamut, hue angle, and environmental robustness (e.g., air-fastness, light-fastness, water-fastness) is not always optimal for use with other colorants and/or ingredients of that ink, or other inks with which it is used in combination. In other words, not only does an individual colorant and/or ink (e.g., cyan, magenta, or yellow ink), have to independently have acceptable color qualities, but it should also work well when used as part of a dye and/or ink set. Additionally, although many inks are known which possess one or more desirable properties, a drawback of many inks is that improvement in one property often results in degradation in another desirable property.

Three-ink dye based printing systems comprising cyan, magenta and yellow inks commonly suffer from high lightness (L*min) in the composite black regions of images, resulting in poor image quality. The issue is often compounded by hazing of prints on special porous photo media, sometimes referred to as "stacked haze." This type of haze occurs after printing, as a result of stacking of printed images. All of the stacked images, other than the uppermost one which is exposed to air and dries quickly, display a hazy film on the printed images. The hazing effect can increase the lightness of the black regions, thus reducing the sharpness of images. Use of a dye-based black ink together with the three-ink composite black, to make a four-ink system, can help to improve the lightness of the black regions. However, the choice of the colorant (i.e., the selected chemical dye compounds) determines the lightness, permanence to light and ozone as well as the extent of observed haze on the images. While some black dyes, or a combination of black dyes, as colorants in black inks have been shown to reduce the lightness of black regions in images, they do not address the issue of hazing.

There is continuing interest in developing colorants and black inks that improve image quality while maintaining permanence, especially on porous print media.

SUMMARY

Methods of producing ink-jetted images using certain black azo dyes and dye blends that reduce both lightness of black regions and stacked haze on printed media are disclosed, together with the printed products. In accordance with certain embodiments, a method of decreasing L*min and reducing stacked haze in a black region of an ink-jet printed image is provided which comprises ink-jetting at least one ink-jet ink onto an ink-jet ink receptive medium to form a printed medium comprising an image having at least one black region; and stacking the printed medium, to obtain a printed medium having decreased L*min and reduced stacked haze in said at least one black region, relative to a printed medium printed with an ink-jet ink lacking said at least one black azo dye. At least one said ink-jet ink includes a black ink-jet ink comprising: a liquid vehicle, and at least one black azo dye having the formula:

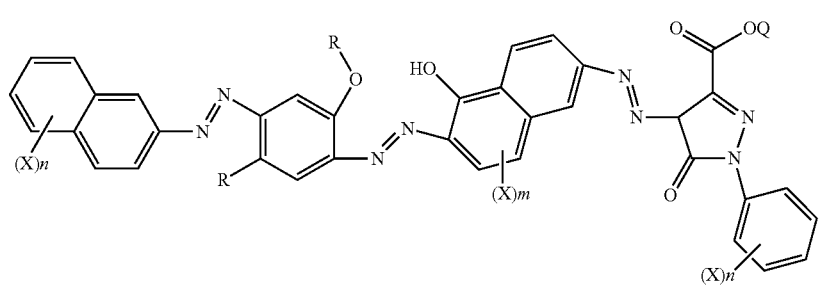

(Formula 1)

wherein X is $SO_3Q$; R is unsubstituted $C_{1-4}$-alkyl; Q is $K^+$, $Na^+$, $Li^+$, or any combination of those; m is 1 or 2; and n is 1, 2, or 3. Thus, embodiments described herein comprise a combination of features and advantages intended to address various shortcomings associated with certain prior methods. The various characteristics described above, as well as other features, will be readily apparent to those skilled in the art upon reading the following detailed description of the preferred embodiments.

DETAILED DESCRIPTION

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "comprising, but not limited to . . . . " Likewise, the singular forms "a," "an," and "the" include plural referents unless the context clearly dictates otherwise. Thus, for example, reference to "a dye" includes reference to one or more of such materials.

An "ink" or "ink-jet ink" refers to a liquid solution or dispersion composition that can comprise a liquid vehicle and a colorant, e.g., a dye, or combination of dyes, or a pigment or combination of pigments, or a dispersed dye or combination of dispersed dyes, or a dye with a pigment or a dispersed dye, or any combination of dyes and/or pigments and/or dispersed dyes. The liquid vehicle can be configured to be stable with the dye through a broad range of solution characteristics, and can be configured for ink-jet printing.

As used herein, "liquid vehicle" is defined to include liquid compositions that can be used to carry colorants to a substrate. Liquid vehicles are well known in the art, and a wide variety of ink vehicles may be used in accordance with various embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as polymers, UV curable materials, and/or plasticizers in some embodiments.

"Media substrate" or "substrate" includes any substrate that can receive ink thereon, and can include papers, overhead projector plastics or films, coated papers such as photobase, fabric, art paper such as water color paper, optical disks, or the like.

"Porous medium" refers to any substantially inorganic particulate-containing coated medium having surface voids and/or cavities capable of absorbing the ink-jet inks in accordance with embodiments of the present invention. Typically, porous media include a substrate and a porous ink-receiving layer. As ink is printed on the porous media, the ink fills the voids and the outermost surface can become dry to the touch more quickly than in the case of traditional or swellable media.

"Stacked haze" or "stacking haze" refers to the hazing of prints on special porous photo media which typically occurs after printing, as a result of stacking of printed images. It usually appears as a hazy film on the dark regions of printed images. This hazing effect increases the lightness of black regions of an image and reduces the sharpness of the image. Typically only the uppermost of a group of stacked images, which is exposed to air and dries quickly, is unaffected by stacking haze.

The term "L*min" refers to the minimum lightness of a black region of an image. When the L*min indicates high lightness of a black region, this typically results in poor image quality. Reduction of the L*min leads to a blacker black region (i.e., lower or reduced lightness).

The term "about" when referring to a numerical value or range is intended to encompass the values resulting from experimental error that can occur when taking measurements.

Concentrations, amounts, measurements, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 0.1 wt % to about 10 wt % should be interpreted to include not only the explicitly recited concentration limits of 0.1 wt % to about 10 wt %, but also to include individual concentrations such as 2 wt %, 3 wt %, 4 wt %, and sub-ranges such as 1 wt % to 5 wt %, 2 wt % to 4 wt %, etc. This same principle applies to ranges reciting only one numerical value. For example, a range recited as "less than about 5 wt %" should be interpreted to include all values and sub-ranges between 0 wt % and 5 wt %. Furthermore, such an interpretation should apply regardless of the breadth of the range or the characteristics being described.

Ink-jet Ink compositions for use in inkjet printing (e.g., either or both piezoelectric and thermal inkjet apparatus), methods for forming printed images, and printed images are disclosed. The present inks generally include a specific type of black azo dye, or a blend of such dyes, suspended in a liquid vehicle, which impart desirable characteristics of low lightness at the darkest regions of an image (L*min) and low haze upon stacking of the printed images. The black azo dye(s) have the following formula:

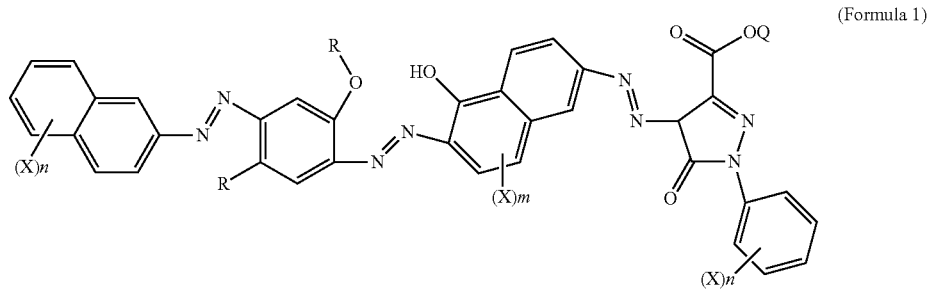

(Formula 1)

wherein X is $SO_3O$; R is unsubstituted $C_{1-4}$ alkyl; Q is $K^+$, $Na^+$, $Li^+$, or any combination of those, or Q is any other suitable monovalent cation; m is 1 or 2; and n is 1, 2, or 3. One representative member of this dye family is "Experimental Black 1" (1H-Pyrazole-3-carboxylic acid, 4-[[6-[[4-[(1,5-disulfo-2-naphthalenyl)azo]-2-methoxy-5-methylphenyl]azo]-5-hydroxy-7-sulfo-2-naphthalenyl]azo]-4,5-dihydro-5-oxo-1-(4-sulfophenyl)-, lithium sodium salt).

Ink Compositions

The above-described black azo dyes belonging to the Formula 1 family of colorants are suitable for use in black inks and multi-color ink sets for ink-jet printing on a variety of printable media, including swellable media, porous media, coated media, and the like. The ink compositions may be prepared in an aqueous formulation or liquid vehicle that contain some or all of the following: water, additional colorants, co-solvents, surfactants, buffering agents, bleed control agents, biocides, sequestering agents, viscosity modifiers, humectants, binders, and any other known ink-jet ink additives.

For instance, the liquid vehicle for the ink may comprise an aqueous-based vehicle that includes water or a mixture of water and at least one water-soluble organic solvent. Selection of a suitable mixture depends on requirements of the specific application, such as desired surface tension and viscosity, the selected colorant, drying time of the liquid, and the type of substrate onto which the liquid will be printed. Some water-soluble organic solvents that may be selected for use in the present inks include, but are not limited to, (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thiodiglycol; (6) lower alkyl mono- or di-ethers derived from alkylene glycols, such as ethylene glycol mono-methyl (or -ethyl)ether, diethylene glycol mono-methyl (or -ethyl)ether, propylene glycol mono-methyl (or -ethyl)ether, triethylene glycol mono-methyl (or -ethyl)ether and diethylene glycol di-methyl (or -ethyl)ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

One or more solvent or co-solvents may be included in the ink formulation in a total amount generally ranging from about 1% (wt %) to about 25%. Suitable co-solvents include, but are not limited to, water soluble organic co-solvents, aliphatic alcohols, aromatic alcohols, diols, glycol ethers, poly(glycol) ethers, N-alkyl caprolactams, unsubstituted caprolactams, both substituted and unsubstituted formamides, both substituted and unsubstituted acetamides, long chain alcohols, ethylene glycol, propylene glycol, diethylene glycols, triethylene glycols, glycerin, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, and the like. Specific examples of co-solvents that are preferably employed in the practice of this invention include, but are not limited to, 1,6-hexanediol, 1,5-pentanediol, 2-pyrrolidinone, 1,(2-hydroxyethyl)-2-pyrrolidinone, trimethylolpropane (EHPD) and tetraethylene glycol.

Selected co-solvents can be added to reduce or enhance the rate of evaporation of water in the ink-jet to minimize clogging or other properties of the ink such as viscosity, pH, surface tension, optical density, and print quality, as desired. Multiple co-solvents can also be used, as is known in the art. An example of an ink vehicle formulation usable in formulating an ink includes one or more solvent or co-solvent, in a (total) amount in the range of about 1% (wt %) to about 50%; from about 2 to about 45 wt %, or from about 5 to about 35 wt %.

In some embodiments, bleed control agents are employed in an amount comprising up to about 5 wt % of the ink-jet ink composition. Some suitable bleed control agents consist of multivalent salts such as calcium nitrate, calcium chloride, calcium acetate, magnesium nitrate, magnesium chloride, magnesium acetate, and combinations of any of those or other salts.

Various buffering agents or pH adjusting agents may also be selected for inclusion in the ink-jet ink compositions. Typical buffering agents include such pH control solutions as Trizma Base, available from Sigma-Aldrich Corp. (Milwaukee, Wis.); 4-morpholine ethane sulfonic acid ("MES"); 4-morpholinepropanesulfonic acid ("MOPS"); and beta-hydroxy-4-morpholinepropane-sulfonic acid ("MOPSO")); hydroxides of alkali metals and amines, such as lithium hydroxide, sodium hydroxide, potassium hydroxide; citric acid, nitric acid, hydrochloric acid, acetic acid, sulfuric acid; amines such as triethanolamine, diethanolamine, and dimethylethanolamine and other basic or acidic components. If used, buffering agents, typically comprise up to about 10 wt % of the ink-jet ink composition.

Various types of additives, may be employed in the inks to optimize the properties of the ink compositions for specific applications. The remainder of the ink composition may be mostly water; however, other independently selected components may be included in some embodiments, including: surfactants, humectants, anti-kogation additives, anti-corrosive additives, polymers, preservatives, biocides that inhibit growth of microorganisms (such as the preservative PROXEL™ GXL available from Avecia Incorporated); chelating agents (or sequestering agents) such as EDTA that eliminate deleterious effects of heavy metal impurities; and viscosity modifiers, which may be added to improve various properties of the ink composition.

One or more surfactants may be included in an ink formulation, such suitable alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, as well as fluorocarbon surfactants. Examples of suitable fluorocarbon surfactants include, but are not limited to, those commercially available from companies such as Omnova Solutions, Inc. of Fairlawn, Ohio under the trade name of PolyFox® fluorocarbon surfactants. Exemplary PolyFox® surfactants include PolyFox PF-136A, PolyFox PF-151N, PolyFox PF-154N, PolyFox PF-156A, and PolyFox PF-159.

Examples of nonionic and amphoteric surfactants include TERGITOL® compounds, which are alkyl polyethylene oxides available from Dow Chemical (Midland, Mich.); TRITON® compounds, which are alkyl phenyl polyethylene oxide surfactants available from Rohm & Haas Co. (Philadelphia, Pa.); BRIJ® compounds available from ICI Americas (Wilmington, Del.); PLURONIC® compounds, which are polyethylene oxide/polypropylene oxide block copolymers; SURFYNOL® compounds, which are acetylenic polyethylene oxides available from Air Products (Allentown, Pa.); anionic surfactants such as members of the DOWFAX™ family of diphenyl sulfonate derivatives available from the Dow Chemical Company, and the CRODAFOS™ family of phosphate esters available from Croda Incorporated; polyethylene oxide ("POE") esters; POE diesters; POE amines; POE amides; and dimethicone copolyols.

The pH of the ink is adjusted, as necessary with any of a wide variety of known pH adjustors such as potassium hydroxide or nitric acid, according to the specific pH requirements of the ink.

Producing Printed Media with Reduced L*m and Reduced Stacking Haze

An above-described black ink-jet ink may be incorporated into any type of ink-jet material dispenser or printer, including but not limited to, thermally actuated ink-jet dispensers, mechanically actuated ink-jet dispensers, electrostatically actuated ink-jet dispensers, magnetically actuated dispensers, piezoelectrically actuated dispensers, continuous ink-jet dispensers, and similar ink-jetting devices. Any type of suitable ink-jet ink receptive porous media as are known for ink-jet printing may be used to receive ink. For example, the inks may be used for imaging and photo printers, including home and commercial printers or for printing on inorganic porous particulate coated media (e.g., silica and/or alumina coated media). Exemplary print media that can be used includes, but is not limited to, HP Advanced Photo Paper, HP Everyday Photo Paper, Semi-gloss, HP Photo Quality Inkjet paper, Glossy HP Photo Paper, HP Brochure Tri-fold Gloss, and HP Advanced Photo Paper Soft/High Gloss.

A process for producing printed media includes ink-jetting onto a suitable ink-jet ink receptive porous print medium an above-described ink-jet ink that contains a black azo dye of the Formula 1 family of colorants. In preferred embodiments, desirably low L*min in black regions of the printed media are thereby obtained. Additionally, in preferred embodiments, when the resulting printed media are stacked after printing, before they are completely dried, the stacked prints are free of stacked haze, in contrast to other similarly printed media produced by printing methods which use other black inks.

A black ink may include about 2% to about 5% of a black azo dye of Formula 1, by weight of the ink. The black azo dye imparts to at least one black region of the resulting printed medium a reduction in stacked haze and a lower L*min, relative to the stacked haze and L*min of the corresponding region(s) of an image printed with the same ink-jet ink lacking the black azo dye.

In some instances, printing is performed using only an above-described black ink, In some instances, a printing method uses a black ink comprising a blend of an above-described black azo dye of Formula 1 and one or more other black or color dye. In still other instances, a printing method includes ink-jetting multiple inks to create a composite image, using an ink set that includes an above-described black azo ink of Formula 1 and one or more color inks such as cyan, magenta and yellow.

Embodiments of printing methods employing the ink formulations described herein potentially reduce lightness (L*min) of black regions of printed images and at the same time reduce stacking haze, to provide improved stacking performance of the printed media compared to many other inkjet printed media in common use today. For example, a black azo dye of the Formula 1 family may be employed in a single ink printing system, a four-ink, six-ink, or eight-ink system to deter the occurrence of stacked haze and lower L*min of black regions of the printed image, compared to images printed with the same inks without the black azo dye. In preferred embodiments, the printing method yields a printed medium in which the L*min of at least one black region of the printed marks or image is between about 4-12 on a CIELAB color space scale of 0-100.

In certain embodiments, the medium comprises a porous medium. In certain embodiments, the black azo dye is about 0.1% to about 10% (by weight) of the black ink. In some embodiments, the black azo dye is about 1% to about 5% of the black ink. In certain embodiments, one black azo dye is 1H-Pyrazole-3-carboxylic acid, 4-[[6-[[4-[(1,5-disulfo-2-naphthalenyl)azo]-2-methoxy-5-methylphenyl]azo]-5-hydroxy-7-sulfo-2-naphthalenyl]azo]-4,5-dihydro-5-oxo-1-(4-sulfophenyl), lithium sodium salt.

In certain embodiments, the black ink comprises at least one Formula 1 black azo dye blended with at least one other dye selected from the group consisting of black dyes, cyan dyes, magenta dyes and yellow dyes. In some embodiments, the cyan dye is a member of the family of dyes having the formula

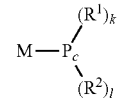

(Formula 2)

wherein M represents a hydrogen atom or a metal atom (or an oxide, hydroxide, or halide thereof), and $P_c$ represents a phthalocyanine nucleus. $R^1$ and $R^2$ each independently represent a substituent selected from the group of $-SOX^1$, $-SO_2X^1$, $SO_2NX^2X^3$, $-SO_3X^4$, wherein $X^1$, $X^2$, $X^3$, and $X^4$ each independently represents a hydrogen atom, a substituted or unsubstituted alkyl group, a substituted or unsubstituted aryl group, or a substituted or unsubstituted heterocyclic group. At least one of $R^1$ or $R^2$ has an ionic hydrophilic group as a substituent. Additionally, k and l each independently represents an integer ranging from 1 to 3. Typically, k and l are each independently selected such that k+l equals 4. In some embodiments $R^1$ is $-SO-(CH_2)_3-SO_3Z$ or $-SO_2-(CH_2)_3-SO_3Z$, and/or $R^2$ is $-SO_2-(CH_2)_3-SO_2NH-C_2H_{40}C_2H_4OH$ or $-SO_2-(CH_2)_3-SO_2NH-CH_2CH(OH)CH_3$, In those embodiments, Z is lithium, sodium, potassium, ammonium, tetramethylammonium, or a mixture thereof. In some embodiments, Z is lithium or potassium. In some embodiments, Z is lithium. In one specific embodiment, $R^1$ is $-SO_2-(CH_2)_3-SO_3Z$, $R^2$ is $-SO_2-(CH_2)_3-SO_2NH-CH_2CH(OH)CH_3$, k is 3, and Z is lithium.

Table I below, provides exemplary phthalocyanine dyes in accordance with certain embodiments, wherein the substituents $R^1$ and $R^2$ are each introduced at the β-position. However, it should be appreciated by those skilled in the art, that although the preferred cyan dye has the R substituent at the β-position, the dye and the ink containing the same can further include the same basic nucleus with the R substituent at different positions such as the α-position.

In the exemplary dyes shown in Table I, M is copper (Cu).

TABLE I

| Cyan Dye | $R_1$ | k | $R_2$ | l |
|---|---|---|---|---|
| C1 | $-SO-(CH_2)_3-SO_3Li$ | 3 | $-SO_2-(CH_2)_3-SO_2NH-CH_2CH(OH)CH_3$ | 1 |
| C2 | $-SO_2-(CH2)_3-SO_3K$ | 2 | $-SO_2-(CH_2)_3-SO_2NH-C_2H_4OC_2H_4OH$ | 2 |
| C3 | $-SO_2-(CH2)_3-SO_3K$ | 3 | $-SO_2-(CH_2)_3-SO_2NH-C_2H_4OC_2H_4OH$ | 1 |
| C4 | $-SO_2-(CH2)_3-SO_3Li$ | 2.7 | $-SO_2-(CH_2)_3-SO_2NH-CH_2CH(OH)CH_3$ | 1.3 |
| C5 | $-SO_2-(CH2)_3-SO_3Li$ | 2 | $-SO_2-(CH_2)_3-SO_2NH-CH_2CH(OH)CH_3$ | 2 |

In some embodiments the cyan dye of Formula 2, $R^1$ is $-SO_2-(CH_2)_3-SO_3Z$, $R^2$ is $-SO_2-(CH_2)_3-SO_2NH-CH_2CH(OH)CH_3$, k is 3, and Z is lithium, Experimental Cyan 1

In certain embodiments, a printing method employs an ink set that includes an above-described black ink and at least one color ink selected from the group consisting of cyan, magenta and yellow. In some embodiments, the ink set includes a cyan ink comprising an above-described cyan dye. In some embodiments, a composite image that comprises at least one black region is formed on the medium. In some embodiments, one or more black azo dye of Formula 1 imparts to the black region(s) a reduction in stacked haze and a lower L*min, relative to the stacked haze and L*min of the corresponding region(s) of an image printed with the same ink(s) lacking the black azo dye.

EXAMPLES

Example 1

A black ink was prepared by combining
2-5% of the azo dye "Experimental Black 1" (1H-Pyrazole-3-carboxylic acid, 4-[[6-[[4-[(1,5-disulfo-2-naphthalenyl)azo]-2-methoxy-5-methylphenyl]azo]-5-hydroxy-7-sulfo-2-naphthalenyl]azo]-4,5-dihydro-5-oxo-1-(4-sulfophenyl)-, lithium sodium salt), which is a member of the Formula 1 family of black azo dyes;
with a vehicle having the following ingredients:
6-12% trimethylolpropane (2-ethyl-2-(hydroxymethyl)-1,3-propanediol, EHPD),
5-10% 2-pyrrolidinone,
1-8% 1.5 pentanediol,
0.1-3% Tergitol 15-S-7,
0.1-1% MES Acid,
0.02-0.1% Dowfax 8390, and
0.05-0.2% EDTA.
When this black ink was printed alone using a HP Deskjet 6540 printer on HP Advanced photopaper the L*min with this ink was determined to be between 4-12.

This black ink was also printed in a 4-ink ink set with a cyan ink containing cuprate(3-), [[3,3',3"-[[23-[[3-[[(2-hydroxypropyl)amino]sulfonyl]propyl]sulfonyl]-29H,31H-phthalocyanine-2,9,16-triyl-κN29, κN30, κN31, κN32]tris(sulfonyl)]tris[1-propanesulfonato]](5-)]-, trilithium, (SP-4-2)-(9Cl), referred to herein as "Experimental Cyan 1," which is a member of the Formula 2 family of cyan dyes; a magenta ink containing the magenta dye 6-Benzothiazolesulfonic acid, 2-[4-cyano-3-(1,1-dimethylethyl)-5-[[4-methyl-6-[(6-sulfo-2-benzothiazolyl)(2,4,6-trimethyl-3-sulfophenyl)amino]-2-[(2,4,6-trimethyl-3-sulfophenyl)amino]-3-pyridinyl]azo]-1H-pyrazol-1-yl], and a yellow ink containing a yellow dye from the following family of dyes:

lenedisulfonic acid, 7-[[4-[[4,6-bis[(3-sulfopropyl)thio]-1,3,5-triazin-2-yl]amino]-3-methoxyphenyl]azo]-, tetrasodium salt (Yellow dye #1)

The resulting printed images had little or no haze in the dark regions of the images after stacking of the images. Stacked haze is determined by measuring the change in L* compared to an un-stacked control.

Example 2

Another black ink was prepared by combining
2-5% of Experimental Black 1 and 0.1-2% of a yellow dye of the Formula 3 family of yellow dyes, 1,5-Naphthalenedisulfonic acid, 3-[[4-[[4,6-bis[(3-sulfopropyl)thio]-1,3,5-triazin-2-yl]amino]-5-methoxy-2-methylphenyl]azo]-, tetrasodium salt (9Cl), (Yellow dye #2) with the vehicle described in Example 1.

The resulting ink was printed as described in Example 1. The L*min of the darkest (i.e., black,) regions of the printed images was determined to be between 4-12. When this black ink was printed in combination with a 3-ink ink set (described in Example 1), the resulting images had little or no haze in the darkest regions after stacking of the printed sheets.

Example 3

A black ink was prepared by combining
1-4% of Experimental black 1,
0.1-0.9% of the magenta dye (6-Benzothiazolesulfonic acid, 2-[4-cyano-3-(1,1-dimethylethyl)-5-[[4-methyl-6-[(6-sulfo-2-benzothiazolyl)(2,4,6-trimethyl-3-sulfophenyl) amino]-2-[(2,4,6-trimethyl-3-sulfophenyl)amino]-3-pyridinyl]azo]-1H-pyrazol-1-yl],
0.5-2.5% of Experimental cyan 1, and
1.0-2.5% of Yellow dye #2 with the same vehicle as described in Example 1. Again, the L*min with this ink was determined to be between 4-12 when printed as described in the above embodiment. When this ink was printed in a 4-ink ink set (cyan, magenta, yellow, black), the resulting images had little or no haze in the darkest regions after stacking of the printed sheets Although 1-5% (by weight) of the black dye is the concentration range used in these examples, it should be understood that any concentration range of the black dye that provides the stated results could be used instead. For instance, a dye is generally present in an ink-jet ink in an amount ranging from

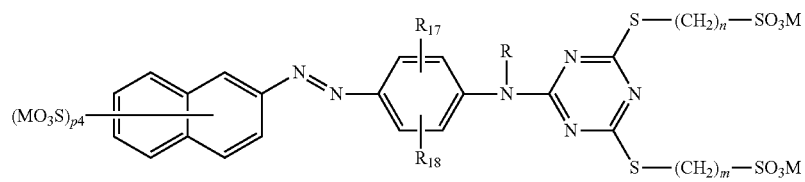 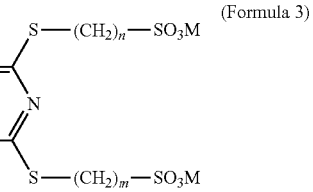

(Formula 3)

wherein R is hydrogen or an alkyl having from 1 to 6 carbon atoms; M is hydrogen or a metal atom or ammonium optionally substituted by alkyl, alkoxyalkyl or hydroxyalkyl; $R_{17}$, $R_{18}$ are independently hydrogen, alkyl or alkoxy, each having from 1 to 3 carbon atoms; $p_4$ is from 1 to 3 and the sulfo group is in position 1, 4, 5, 6, 7 or 8 in the case where $p_4$ is equal to 1; the sulfo groups are in positions 4 and 8, 5 and 7, 6 and 8 or 1 and 5 in the case where $p_4$ is equal to 2; or the sulfo groups are in positions 3, 6 and 8 or 4, 6 and 8 in the case where $p_4$ is equal to 3; and n, m are each independently from 2 to 6. Specifically, a yellow ink containing the dye, 1,3-Naphthaabout 0.1 wt % to about 10 wt %. The results obtained with the thermal ink-jet printer described above are considered representative of similar decreased lightness and reduced haze that may be obtained with other ink-jet dispensing devices such as piezoelectric printers, for instance.

Comparative Example A

For comparison, a black ink was prepared by combining 2-5% of the azo dye Experimental black 2 belonging to the following dye class:

(Formula 4)

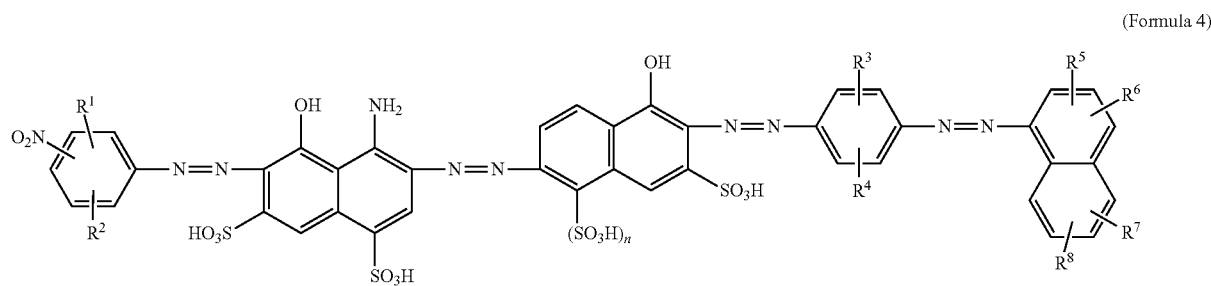

wherein $R^1$ and $R^2$ each independently represents a hydrogen, a halogen, a cyano group, a carboxy group, a sulfo group, a sulfamoyl group, a N-alkylaminosulfonyl group, and a N-phenylaminosulfonyl group; $R^3$, $R^4$, $R^5$, $R^6$, $R^7$, and $R^8$ each independently represents a hydrogen, a halogen group, a hydroxy group, a cyano group, a carboxy group, a sulfo group, a sulfamoyl group, a N-alkylaminosulfonyl group, a N-phenylaminosulfonyl group; and n is 0 or 1.

The vehicle composition was the same as in Example 1. Upon printing, as described in Example 1, the darkest regions of the resulting images had severe hazing caused by this dye, and yielded a poorer (i.e., higher) L*min than the black dye and dye blends of Examples 1-3.

Comparative Example B

In another comparative test, a black ink was prepared by combining 2-5% of the azo dye Ilford K1334, in the same manner as Comparative Example A. Upon printing, it was also apparent that this dye caused the darkest regions of the resulting images to have severe hazing and the L*min was high in stacked images.

Comparative Example C

In another comparative test, a black ink was prepared by combining 2-5% of the Experimental black 3 dye (2,7-Naphthalenedisulfonic acid, 3-[[4-[[4-[[5-(aminocarbonyl)-1-ethyl-1,6-dihydro-2-hydroxy-4-methyl-6-oxo-3-pyridinyl]azo]-2-sulfophenyl]azo]-2,5-bis(2-hydroxyethoxy)phenyl]azo]-4,5-dihydroxy-, potassium sodium salt), in the same manner as Comparative Example A. Upon printing, this dye also caused the darkest regions of the resulting images to have severe hazing and the L*min was significantly higher in stacked images compared to unstacked images.

Comparative Example D

The comparative dyes Experimental black 3 and Ilford dye K1334 were also blended with the various yellow, cyan and magenta dyes as in Examples 1-3 and tested for stacked haze and L*min. The test results showed that these comparative black dyes, in blends similar to those of Examples 1-3, also caused severe hazing and poor L*min.

The well known CIELAB (CIEL*a*b*) system is used to measure or specify the chromaticity (c*, square root of the sum of a*2 and b*2) or the properties of hue [arctan (b*/a*)] and saturation (c*/L*) on a two-dimensional chromaticity diagram. The a* measures redness-greenness on the x-axis, or the horizontal axis, and b* measures yellowness-blueness on the y-axis, or the vertical axis. The L* measures lightness-darkness on the z-axis. To assess the L*min of the ink compositions and the ability of the black azo dyes of Formula 1 to decrease L*min compared to other black dyes, the ink compositions were printed on porous media using an ink-jet printer, and the darkness of the black regions was assessed using the CIELAB system.

All the gray ramps were printed with the same set of cyan, magenta and yellow inks and only the black ink was varied in the experiment.

The extent of hazing in the black regions of the printed images was assessed by measuring the average change in L* across a gray ramp or the change in L*min of images before and after stacking of print samples. Images were printed on porous photo media and stacked for 24 hrs and then left unstacked for a couple of hours. The L*min of the stacked images was compared with the L*min of the uppermost unstacked image. These results are summarized in Table 1.

TABLE 1

| Black ink | 4-ink L*min | Av L* of darkest 4 squares in a gray ramp before stacking | Av L* of darkest 4 squares in a gray ramp after stacking | Δ L* (Change in Average L*after stacking) |
|---|---|---|---|---|
| Comparative Example B | 9.09 | 13.44 | 18.24 | 4.8 |
| Comparative Example C | 9.42 | 13.42 | 18.08 | 4.66 |
| Example 1 | 8.95 | 14.14 | 16.67 | 2.53 |

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications. The disclosures of all patents, patent applications and publications cited herein are hereby incorporated herein by reference, to the extent that they provide procedural or other details consistent with and supplementary to those set forth herein.

What is claimed is:

1. A method of decreasing L*min and reducing stacked haze in a black region of an ink-jet printed image, comprising:
ink-jetting at least one ink-jet ink onto an ink-jet ink receptive medium to form a printed medium comprising an image having at least one black region,
wherein at least one said ink-jet ink includes a black ink-jet ink comprising:
a liquid vehicle, and
at least one black azo dye having the formula:

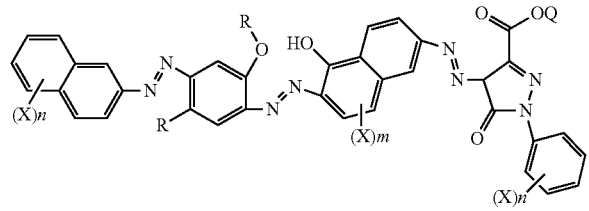

wherein X is $SO_3O$; R is unsubstituted $C_{1-4}$-alkyl; Q is $K^+$, $Na^+$ or $Li^+$, or any combination of those; m is 1 or 2; and n is 1, 2 or 3; and
stacking said printed medium, to obtain a printed medium having decreased L*min and reduced stacked haze in said at least one black region, relative to a printed medium printed with an ink-jet ink lacking said at least one black azo dye.

2. The method of claim 1, wherein said ink receptive medium comprises a porous medium.

3. The method of claim 1, wherein one said black azo dye is 1H-Pyrazole-3-carboxylic acid, 4-[[6-[[4-[(1,5-disulfo-2-naphthalenyl)azo]-2-methoxy-5-methylphenyl]azo]-5-hydroxy-7-sulfo-2-naphthalenyl]azo]-4,5-dihydro-5-oxo-1-(4-sulfophenyl)-lithium sodium salt.

4. The method of claim 1, wherein said black ink-jet ink comprises said at least one black azo dye blended with at least one other dye selected from the group consisting of black dyes, cyan dyes, magenta dyes and yellow dyes.

5. The method of claim 4, wherein at least one cyan dye has the formula

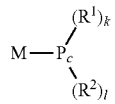

wherein
M is a hydrogen atom or a metal atom or an oxide, hydroxide, or halide thereof,
$P_c$ is a phthalocyanine nucleus,
$R^1$ and $R^2$ are each independently a substituent selected from the group consisting of —$SOX^1$, —$SO_2X^1$, $SO_2NX^2X^3$, and —$SO_3X^4$,
wherein $X^1$, $X^2$, $X^3$, and $X^4$ are each independently a hydrogen atom, a substituted or unsubstituted alkyl group, a substituted or unsubstituted aryl group, or a substituted or unsubstituted heterocyclic group, and
wherein at least one of $R^1$ and $R^2$ has an ionic hydrophilic group as a substituent, and
k and l are each independently an integer ranging from 1 to 3.

6. The method of claim 4, wherein at least one said magenta dye is 6-Benzothiazolesulfonic acid, 2-[4-cyano-3-(1,1-dimethylethyl)-5-[[4-methyl-6-[(6-sulfo-2benzothiazolyl)(2,4,6-trimethyl-3-sulfophenyl)amino]-2-[(2,4,6-trimethyl-3-sulfophenyl)amino]-3-pyridinyl]azo]-1H-pyrazol-1-yl].

7. The method of claim 1, wherein at least one said yellow dye has the formula:

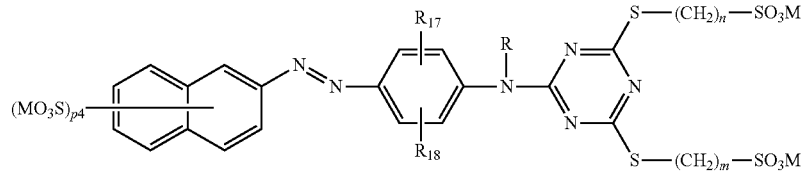

wherein
R is hydrogen or an alkyl having from 1 to 6 carbon atoms;
M is hydrogen or a metal atom or ammonium optionally substituted by alkyl, alkoxyalkyl or hydroxyalkyl;
$R_{17}$, $R_{18}$ are independently hydrogen, alkyl or alkoxy, each having from 1 to 3 carbon atoms;
$p_4$ is from 1 to 3, wherein
the sulfo group is in position 1, 4, 5, 6, 7 or 8 in the case where $p_4$ is equal to 1, or
the sulfo groups are in positions 4 and 8, 5 and 7, 6 and 8, or 1 and 5, in the case where $p_4$ is equal to 2, or
the sulfo groups are in positions 3, 6 and 8 or 4, 6 and 8 in the case where $p_4$ is equal to 3; and
n and m are each independently from 2 to 6.

8. The method of claim 1, wherein said at least one ink-jet ink comprises an ink set including said black ink and at least cyan, magenta and yellow inks.

9. The method of claim 8, wherein said cyan ink comprises a cyan dye having the formula

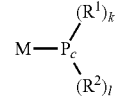

wherein
M is a hydrogen atom or a metal atom or an oxide, hydroxide, or halide thereof,
$P_c$ is a phthalocyanine nucleus,
$R^1$ and $R^2$ are each independently a substituent selected from the group consisting of —$SOX^1$, —$SO_2X^1$, $SO_2NX^2X^3$, and —$SO_3X^4$,
wherein $X^1$, $X^2$, $X^3$, and $X^4$ are each independently a hydrogen atom, a substituted or unsubstituted alkyl group, a substituted or unsubstituted aryl group, or a substituted or unsubstituted heterocyclic group, and
wherein at least one of $R^1$ or $R^2$ has an ionic hydrophilic group as a substituent, and
k and l are each independently an integer ranging from 1 to 3.

10. The method of claim 8, wherein said magenta ink comprises the magenta dye 6-Benzothiazolesulfonic acid, 2-[4-cyano-3-(1,1-dimethylethyl)-5-[[4-methyl-6-[(6-sulfo-2benzothiazolyl)(2,4,6-trimethyl-3-sulfophenyl)amino]-2-[(2,4,6-trimethyl-3-sulfophenyl)amino]-3-pyridinyl]azo]-1H-pyrazol-1-yl].

11. The method of claim 8, wherein said yellow ink comprises a yellow dye having the formula:

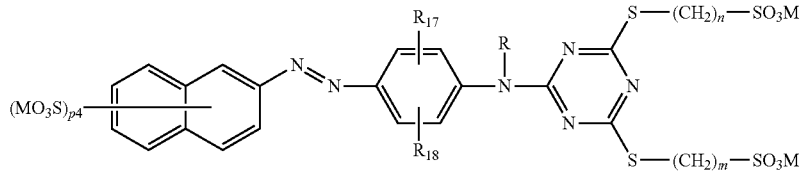

wherein
R is hydrogen or an alkyl having from 1 to 6 carbon atoms;
M is hydrogen or a metal atom or ammonium optionally substituted by alkyl, alkoxyalkyl or hydroxyalkyl;
$R_{17}$, $R_{18}$ are independently hydrogen, alkyl or alkoxy, each having from 1 to 3 carbon atoms;
$p_4$ is from 1 to 3, wherein
the sulfo group is in position 1, 4, 5, 6, 7 or 8 in the case where $p_4$ is equal to 1, or
the sulfo groups are in positions 4 and 8, 5 and 7, 6 and 8, or 1 and 5, in the case where $p_4$ is equal to 2, or
the sulfo groups are in positions 3, 6 and 8 or 4, 6 and 8 in the case where $p_4$ is equal to 3; and
n and m are each independently from 2 to 6.

12. The method of claim 8, wherein said jetting of said at least one ink-jet ink onto said medium comprises forming a composite image on said medium, wherein said composite image comprises said at least one black region.

13. The method of claim 1, wherein said at least one black azo dye imparts to said at least one black region a reduction in stacked haze and a lower L*min, relative to the stacked haze and L*min of the corresponding region(s) of an image printed with the same at least one ink-jet ink lacking said black azo dye.

14. The method of claim 1, wherein the L*min of said at least one black region is between about 4-12 on a CIELAB color space scale of 0-100.

15. The method of claim 1, wherein said black ink comprises about 0.1% to about 10% of said at least one black azo dye by weight of the ink.

16. The method of claim 15, wherein said black ink comprises about 1% to about 5% of said at least one black azo dye by weight of the ink.

* * * * *

UNITED STATES PATENT AND TRADEMARK OFFICE
CERTIFICATE OF CORRECTION

PATENT NO.        : 8,562,121 B2                                    Page 1 of 1
APPLICATION NO.   : 12/744923
DATED             : October 22, 2013
INVENTOR(S)       : Sukanya Rengaswamy et al.

It is certified that error appears in the above-identified patent and that said Letters Patent is hereby corrected as shown below:

In the Claims:

In column 13, line 29, in Claim 1, delete "$SO_3O$;" and insert -- $SO_3Q$; --, therefor.

In column 14, line 5, in Claim 6, delete "2benzothiazolyl)" and insert -- 2-benzothiazolyl) --, therefor.

In column 14, line 63, in Claim 10, delete "2benzothiazolyl)" and insert -- 2-benzothiazolyl) --, therefor.

Signed and Sealed this
Seventeenth Day of June, 2014

Michelle K. Lee
*Deputy Director of the United States Patent and Trademark Office*